March 23, 1965     W. J. EGGINGTON ET AL     3,174,572
VEHICLES FOR TRAVELLING OVER LAND AND/OR WATER
Filed July 25, 1961     3 Sheets-Sheet 1

Inventors
W. J. EGGINGTON
E. G. TATTERSALL
By Cameron, Kerkam & Sutton
Attorneys Inventors
W. J. EGGINGTON
E. G. TATTERSALL
By Cameron, Kerkam & Sutton
Attorneys March 23, 1965  W. J. EGGINGTON ET AL  3,174,572
VEHICLES FOR TRAVELLING OVER LAND AND/OR WATER
Filed July 25, 1961  3 Sheets-Sheet 3

Inventors
W. J. EGGINGTON
E. G. TATTERSALL
By Cameron, Kerkam & Sutton
Attorneys

United States Patent Office 3,174,572
Patented Mar. 23, 1965

3,174,572
VEHICLES FOR TRAVELLING OVER LAND AND/OR WATER
Wilfred James Eggington, Highworth, Wilts, and Edward Gunston Tattersall, East Cowes, Isle of Wight, England, assignors to Hovercraft Development Limited, London, England, a British company
Filed July 25, 1961, Ser. No. 126,705
Claims priority, application Great Britain, July 26, 1960, 26,017/60
11 Claims. (Cl. 180—7)

This invention relates to vehicles for travelling over a surface, which are at least partly supported above the surface by a cushion of pressurised gas at least partly formed and maintained by a curtain of fluid issuing from a supply port or series of supply ports formed in the bottom of the vehicle parallel to the periphery thereof and in which at least part of the fluid forming the curtain or curtains is recovered for reuse through a further port or series of ports, hereinafter called "recovery ports," in the bottom of the vehicle, inboard of the supply port or ports, the recovered air flowing through a duct or ducts referred to as recovery duct or ducts. Such vehicles are described in the specification of the copending application of Christopher Sidney Cockerell Serial No. 837,428, filed September 1, 1959, and hereinafter will be referred to as "of the type described."

With vehicles of the type described, the operating conditions may vary such as to reduce the clearance between the bottom surface of the vehicle and the surface over which the vehicle is travelling, either locally or for the entire bottom surface of the vehicle. The reduction in clearance is liable to restrict the flow of curtain forming fluid to the recovery ports resulting in a flow of gas from the cushion into the recovery ports with a consequent loss of lift. This causes instability in heave, roll and pitch.

By providing means which control the flow of fluid into the recovery port, either locally or totally, the instability can be at least partly prevented. The ability to control the flow of any fluid into the recovery port can also provide, as hereinafter described, means for reducing such instability occurring due to other reasons. According to the invention there is provided a vehicle for travelling over a surface which is at least partly supported above the surface by a cushion of pressurised gas at least partly formed and contained beneath the vehicle by a curtain of fluid issuing from a supply port or series of supply ports formed in the bottom of the vehicle, adjacent to the periphery thereof, at least part of the curtain forming fluid being recovered for reuse through a recovery port or series of recovery ports formed in the bottom of the vehicle, inboard of the supply port or ports, in which at least one member is provided for controlling the flow of fluid into the recovery port or ports.

Normally, in vehicles of the type described, the fluid forming the curtains and the cushion gas is air, and for convenience hereinafter will be referred to as such, although other mediums such as exhaust gases may be used, and possibly water.

The invention will be understood by the following descriptions of certain embodiments, in conjunction with the accompanying drawings in which.

Figure 1:
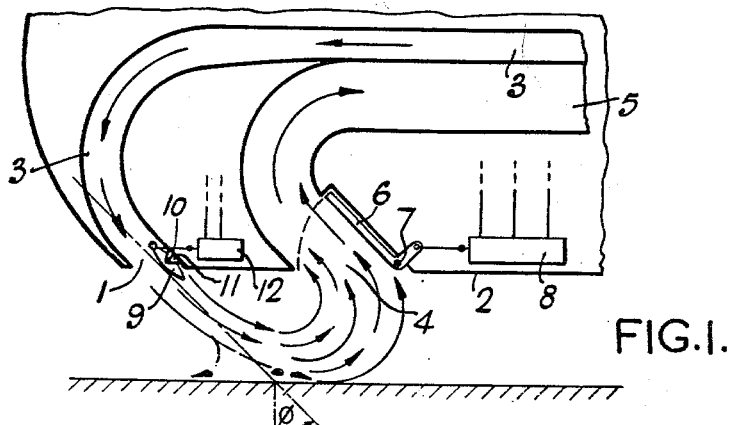
FIGURE 1 is a diagrammatic vertical cross-section through the periphery of a vehicle illustrating one form of the invention.

FIGURE 1 illustrates the use of a hinged flap to restrict the flow of air into the recovery port. An annular supply port 1 is formed in the bottom surface 2 of the vehicle, the supply port being adjacent to and parallel to the periphery of the bottom of the vehicle. A supply duct 3 supplies air from a convenient source, such as the compressor 26 shown in FIGURE 5, to the supply port 1. An annular recovery port 4 is formed in the bottom 2 of the vehicle inboard of and parallel to the supply port. A recovery duct 5 leads from the recovery port to energising means, not shown, which is conveniently the source of air connected with the supply duct 3 referred to above.

A series of flaps 6, pivoted at 7, are provided in the recovery duct 5. The pivot point 7 is formed at the inner edge of the recovery port 4 and in their closed positions the flaps 6 lie across the recovery port 4 to completely close it. In the other extreme or open position, the flaps 6 lie close to the inner wall of the recovery duct 5 so as to leave entry into the duct through the recovery port unobstructed.

The flaps may be arranged to close under their own weight, with or without the addition of a spring. However the pressure differences at various operating conditions are likely to be very small and a power operated control device will then be required. As shown in FIGURE 1, the flaps 6 are operated by actuators 8, which may be of a hydraulic, pneumatic or other suitable type. The operation of the actuators may be under the control of a device sensing a parameter the variation of which is significant of the curtain configuration. Typical of such parameters are the pressure across the flaps 6 and the efflux angle $\phi$ of the curtain forming air issuing from the supply port 1. In FIGURE 1 the actuator is under the control of a sensing device comprising a vane 9, hinged at 10 on a bracket 11 attached to the inner edge of the supply port 1. The rotational position of the vane 9 varies according to the efflux angle of the air flow from the supply port and controls a valve 12 which in turn controls the actuators 8, being biased to normally position the flaps 6 in their closed positions.

Figure 2:
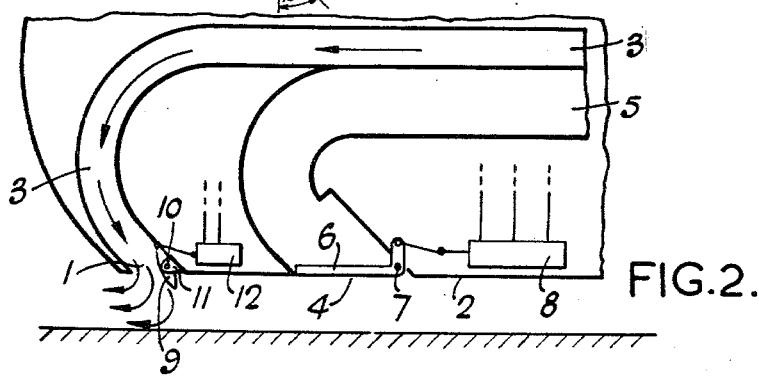
FIGURE 2 is a similar view to that of FIGURE 1, illustrating the action of the invention at a reduced clearance.

FIGURE 2 illustrates the operation of the flaps 6 when the vehicle approaches the surface, reducing clearance between the bottom of the vehicle and the surface. The reduction of the clearance restricts the flow of air from the supply port 1 to the recovery port 4, resulting in an increased flow of curtain forming air outwards into the surrounding atmosphere. This variation in curtain configuration affects the rotational position of the vane 9 causing it to rotate about the pivot 10 and operating the valve 12. Operation of the valve 12 causes the actuators 8 to move the flaps 6 into their closed position.

Another operation resulting in a control of the flow of curtain forming air into the recovery port is the initial starting of the vehicle from rest. At such times the flaps 6 are closed due to the biased condition of vane 9. Air issues from the supply port 1 flowing initially inwards beneath the vehicle. A cushion of pressurized air is rapidly built up beneath the vehicle gradually lifting it. Whilst the vehicle is gradually lifting, the efflux angle $\phi$ of the air curtain is such as to cause the vane 9 to maintain the valve 12 in a position such that the actuator 8 maintains the flaps 6 in a closed position. When the normal operation height is reached, the efflux angle of the certain forming air issuing from the supply port 1 has so changed that the vane 9 has been rotated about its pivot point 10 and has so operated the valve 12 as to cause the actuator 8 to move the flaps 6 into the open position, at which time the curtain assumes the form shown in FIGURE 1.

When the flaps 6 are closed, no air can flow through the recovery duct 5. Therefore, if the source of air to the supply duct and supply part 1 is normally fed by the air recovered into the recovery duct, it is necessary to provide an alternative air supply when the flaps 6 are closed. Thus auxiliary air intakes are required, such as those hereinafter described with reference to FIGURES 5 and 6, the flow of air from these auxiliary intakes being controlled in conjunction with the control of the flaps 6. Even when the flaps are in their fully open position it is usually necessary to provide some extra air to make up for losses, and it is generally arranged so that the supply of air from auxiliary intakes is not completely shut off.

Restriction of the flow of curtain forming air to the recovery ports can occur locally as well as simultaneously over the whole of the bottom of the vehicle. Typical examples of such operating conditions are when passing over waves, rocks, sand-dunes or the like. It will only be necessary for the flow of fluid into the recovery duct to be controlled locally in these cases and a number of sensing devices, such as the vane 9, are provided around the vehicle periphery, each for controlling the flow of air into the recovery duct at the locality of the sensing device.

Figure 3:
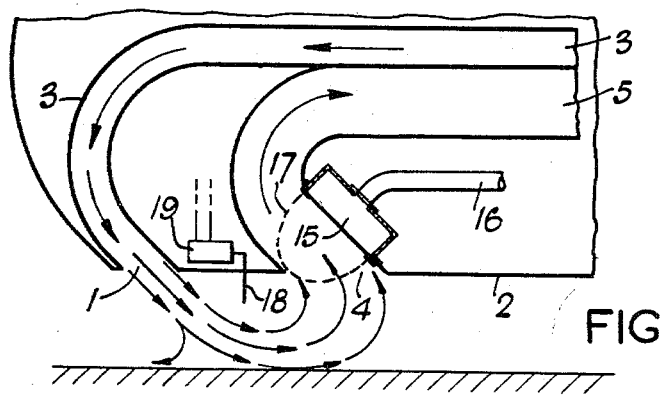
FIGURE 3 is a similar view to that of FIGURE 1 illustrating another form of the invention.

Instead of flaps other forms of members may be used. FIGURE 3 illustrates the use of inflatable portions 15 in the wall of the recovery duct 5. The inflatable portions are in the form of a flexible tube which is inflated from a suitable pressure source via a pipe 16, to partially or wholly block the recovery duct 5 as indicated by the dotted line 17. The inflation of the portions 15 is controlled by a sensing device, as the flaps 6 in FIGS. 1 and 2. In the present example an alternative sensing device is shown, comprising a pressure sensing head 18, which senses the pressure in the space between the supply port 1 and the recovery port 4, and a valve 19.

Figure 4:
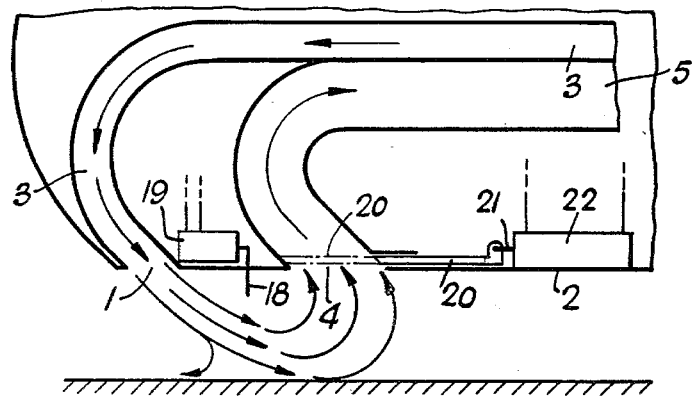
FIGURE 4 is again a similar view to that of FIGURE 1 illustrating yet another form of the invention.

A further alternative, illustrated in FIGURE 4, has sliding flaps 20. Each flap is operated by a rod 21, by an actuator 22 under the control of a pressure-sensing device, and obstructs the recovery port 4. The pressure sensing device is similar to that of FIGURE 3, comprising a pressure sensing head 18 which again senses the pressure in the space between the supply port 1 and the recovery port 4, and a controlling valve 19.

The pressure sensing devices operate as follows. During normal operation of the vehicle, with the normal curtain configuration as in FIGURES 3 and 4, the pressure in the space between the supply port 1 and recovery port 4 is less than the cushion pressure. If the operating conditions of the vehicle alter to restrict the flow of curtain forming air beneath the bottom surface, to the recovery port, then the air flows outwards instead of inwards. The cushion pressure will then extend beyond the recovery port and be sensed by the pressure head 18, detecting an increase in pressure. This results in operation of the valve 19, and the inflation of the inflatable portion or portions 15 in FIGURE 3, or the closing of the flaps 20 in FIGURE 4.

Figure 5:
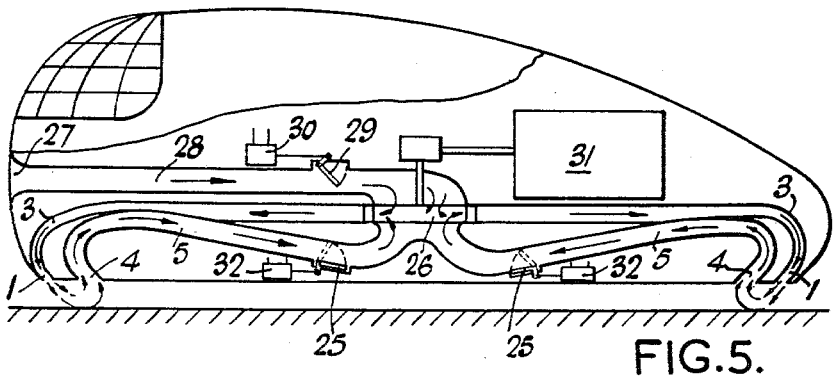
FIGURE 5 is a diagrammatic vertical cross-section through a vehicle illustrating an alternative application of the invention of the form shown in FIG. 1.

The means for controlling the flow of air into the recovery port need not necessarily be positioned adjacent to the recovery port and in many instances it will be preferred not to have moving members at this position. FIGURE 5 illustrates a vehicle in which hinged flaps 25 are normally housed in recesses in the walls of recovery duct 5 positioned close to the intake of the re-energising compressor 26. The air flow, in normal operation, is from the compressor 26, through the supply duct 3 to the supply port 1, from which it issues to form a curtain. The curtain forming air is recovered through the recovery port 4 from which it flows through the recovery duct 5 to the inlet of the compressor 26. To make up for losses from the curtain system, additional air is taken in through auxiliary inlet 27, flowing via the duct 28 to the compressor 26. A further hinged flap 29 controls the flow of air from the intake, being operated by an actuator 30. The compressor 26 is driven by an engine 31.

When it is desired to restrict the flow of air through the recovery duct 5, the hinged flaps 25 are moved to their closed position (indicated in broken lines in FIGURE 5) by actuators 32 which may be controlled automatically by pressure sensing heads and valves similar to those shown in FIGURE 4. All the flaps 25 may be moved to the closed position or only those corresponding to that part of the vehicle periphery over which it is desired to restrict flow into the recovery duct. As the flaps 25 are moved to the closed position the flap 29 is opened, to allow additional air to flow to the compressor from the intake 27. Although the flaps 25 and 29 may move independently, they are normally operated together under the control of a common sensing head and valve arrangement like that of FIGURE 4.

Figure 6:
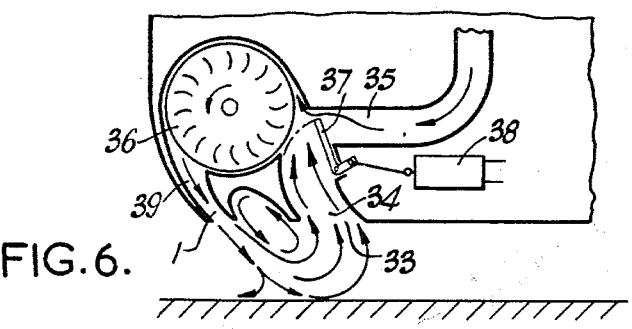
FIGURE 6 is a diagrammatic vertical cross-section through the periphery of a vehicle illustrating a further form of the invention.

A further form of vehicle to which the invention can be applied is one in which the curtain forming air is energised at the vehicle periphery. Such a vehicle is more fully described in the copending application of Christopher Sidney Cockerell, Serial No. 100,420, filed April 3, 1961. FIGURE 6 illustrates one particular form of such a vehicle. The air forming the curtain is energised by the pump 36, flowing through a supply duct 39 to a supply port 1. After issuing from the supply port and forming the curtain, the air is recovered through a recovery port 33 into a recovery duct 34 by which the air is fed back to the pump 36. Additional air is supplied from an auxiliary intake by a duct 35. A hinged flap 37 acts in one position to reduce the flow of additional air to that required to make up for losses from the curtain system. In its other position, the flap closes the recovery duct to prevent flow therethrough, and allows sufficient additional air to flow from the auxiliary intake to maintain the air curtain. The flap 37 is moved by an actuator 38 which can be controlled by any suitable sensing means, such as a vane in the supply port or a pressure sensing head, as described above in relation to FIGURES 1 to 4.

Figure 7:
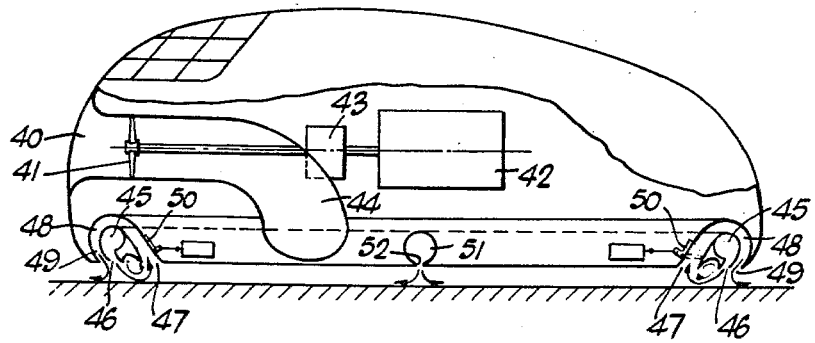
FIGURE 7 is a diagrammatic vertical cross-section through a vehicle illustrating yet another form of the invention.
Figure 8:
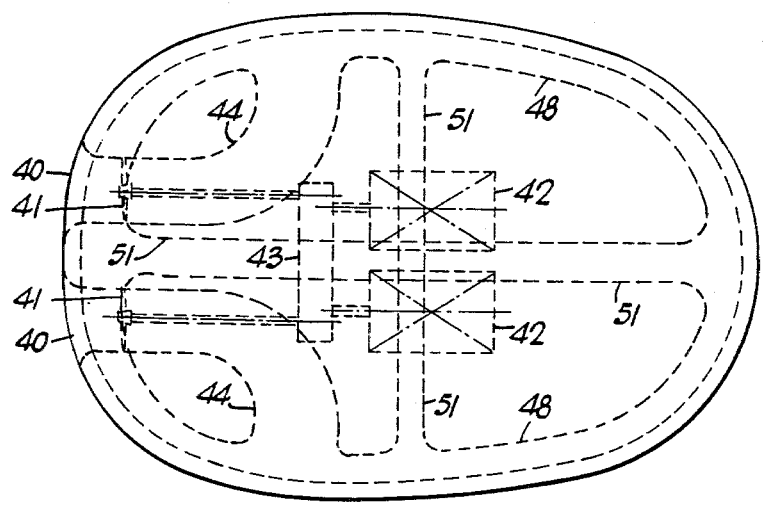
FIGURE 8 is a plan view of the vehicle shown in FIGURE 7.

Another form of vehicle embodying the invention is shown in FIGURES 7 and 8. In this vehicle, the curtain is of the form in which the recovered air is not returned to the reenergising means but is used to form a further curtain. As shown, air enters intakes 40 at the front of the vehicle and is energised by propellers 41 driven by engines 42. To avoid difficulties due to an engine failure, the engines drive a common gear box 43, from which drives are taken for the propellers. From the propellers the air flows through ducts 44 to a supply duct 45 which is positioned near the periphery of the bottom of the vehicle. A supply port 46 is formed in the bottom of the supply duct 45. The air issues in an inwards and downwards direction, curving round in contact with the surface and flowing upwards into a recovery port 47 formed inboard of and parallel to the supply port 46. A transfer duct 48 is formed round the supply duct 45, its inner end communicating with the recovery port 47 and its outer end communicating with a transfer supply port 49, which is positioned outboard of and immediately adjacent to the supply port 46. Thus the air forms first an inner curtain, the air being recovered and reissuing outside the inner curtain to form a further curtain. Hinged flaps 50 are provided for controlling the flow of air through the recovery port 47 and transfer duct 48, locally or entirely, as described above in relation to FIGURES 1 and 2. Operation of the flaps may be in a similar manner.

As stated above, the ability to control flow of air into the recovery port, either at one or more spaced apart locations or for the total peripheral extent of the recovery duct, can be used to improve the stability of the vehicle.

Thus, for example, if the vehicle becomes unstable in pitch, which may be due to rough water, rough ground and the like or for aerodynamic reasons, it is possible to oppose variations in altitude of the vehicle by moving the centre of pressure of one or more cushions. Considering the various forms of vehicle described above and illustrated in the accompanying drawings, it will be seen that downward pitching of the front of the vehicle can be at least partly opposed by restricting the flow of fluid into the recovery duct at the front of the vehicle. By so doing, the air curtain flows finally outwards instead of inwards into the recovery port and the area occupied by the cushion is extended forwards to the supply port. This has the effect of moving the centre of pressure forwards relative to the centre of gravity of the vehicle and creating a righting moment opposing the downward pitching movement of the front of the vehicle. Such a movement of the centre of pressure will also tend to oppose an upward pitching of the back of the vehicle. Suitable operation of the flow restricting means at other positions can be used to oppose other movements such as downward pitching at the back and also roll which causes downward movement of one side or the other of the vehicle.

The controlling means for such use in pitching and rolling of the vehicle will still be operated by the normal actuators under the control of control valves responsive to such pitch and roll. In many cases, sensing devices as are shown in FIGURES 1 to 4 can be arranged to detect such movements and produce operation of the controlling means accordingly.

In all of the examples described, the member or members controlling the flow of air into the recovery port may be positioned so that, in what can be considered as normal operating conditions, that is when the curtain configuration is of the designed form, the member or members partially restrict flow into the recovery port. It is then possible to increase the flow of air into the recovery port by moving the member or members to a more fully open position. This affords the possibility of allowing a mass flow of air into the recovery port which is greater than that of curtain forming air. The extra air above that of the curtain forming air will come from the air cushion, the pressure of which can thus be artifically depressed. By such means a moment can be created which opposes a movement of the vehicle, locally or as a whole, upwards relative to the surface.

The arrangements described above may be used in vehicles in which additional curtains and/or keel members are provided for improving the stability of the vehicle as described in the specification of the copending application of Christopher Sidney Cockerell, Serial No. 16,677, filed March 22, 1960. For example, as shown in FIGURES 7 and 8 further ducts 51 may be provided having further supply ports 52. Air flows from the duct 45 into the ducts 51 and thence out of the supply ports 52 to form air curtains which divide the space occupied by the cushion into separate compartments.

The supply and recovery ports may be formed in parts of the vehicle forming the main structure of the vehicle, or they may be formed in parts which are flexibly attached to the main structure of the vehicle as disclosed in the copending application of Christopher Sidney Cockerell, Serial No. 837,502, filed September 1, 1959.

The constructions described above may also be used in vehicles where the recovered air is used for other purposes than recirculating back to the curtain or curtains, such as when being used for propulsion and the like.

Whilst, in the examples described above, the supply port and recovery port are of annular formation the supply and recovery ports may each be in the form of a series of ports in an annular or part annular configuration.

Where more than one system of supply and recovery ports are provided to form parallel curtain formations, the invention may be applied to any or all of the systems.

The applications of Cockerell referred to herein are assigned to the assignee of the instant application.

We claim:

1. A vehicle for travelling over a surface which is at least partly supported above that surface by a cushion of pressurised gas at least partly formed and contained beneath the vehicle by a curtain of fluid issuing from a supply port formed in the bottom of the vehicle adjacent to the periphery thereof, said vehicle comprising a recovery port formed in the bottom of the vehicle, inboard of and substantially parallel to the supply port, through which part of the curtain forming fluid is normally recovered for re-use, the recovery port being adjacent to the supply port and bounding an area of the bottom surface of the vehicle inboard of said recovery port against which the cushion pressure is exerted during normal operation of the vehicle, and means for controlling the flow of curtain forming fluid into the recovery port.

2. A vehicle for travelling over a surface which is at least partly supported above that surface by a cushion of pressurised gas at least partly formed and contained beneath the vehicle by a curtain of fluid issuing from a supply port formed in the bottom of the vehicle adjacent to the periphery thereof, said vehicle comprising a recovery port formed in the bottom of the vehicle, inboard of the supply port, through which part of the curtain forming fluid is normally recovered for re-use, means for controlling the flow of curtain forming fluid into the recovery port, sensing means for sensing variations from a predetermined value in the clearance between the bottom of the vehicle and the surface, and means controlled by said sensing means for operating said flow controlling means.

3. A vehicle as claimed in claim 2 in which the sensing means is operative to cause movement of the means controlling the flow of fluid into the recovery port to restrict the flow of fluid into the recovery port when there is a decrease in clearance between the bottom of the vehicle and the surface.

4. A vehicle as claimed in claim 2 in which the means for controlling the flow of fluid into the recovery port comprises a pivoted flap adapted to vary the effective size of the recovery port.

5. A vehicle as claimed in claim 2 in which the means for controlling the flow of fluid into the recovery port comprises a sliding flap adapted to vary the effective size of the recovery port.

6. A vehicle as claimed in claim 2 in which the sensing means comprises a pressure sensing head adjacent to the bottom of the vehicle so located as to sense the pressure in the region between the supply port and the recovery port.

7. A vehicle as claimed in claim 2 in which the means for controlling the flow of fluid into the recovery duct comprises a member having an inflatable portion adapted, when inflated, to vary the effective size of the recovery port.

8. A vehicle for travelling over a surface which is at least partly supported above that surface by a cushion of pressurised gas at least partly formed and contained beneath the vehicle by a curtain of fluid issuing from a supply port formed in the bottom of the vehicle adjacent to the periphery thereof, said vehicle comprising a recovery port formed in the bottom of the vehicle, inboard of the supply port, through which part of the curtain forming fluid is normally recovered for re-use, means for controlling the flow of curtain forming fluid into the recovery port, sensing means for sensing variations of a parameter significant of the fluid curtain configuration, and means controlled by said sensing means for operating said flow controlling means.

9. A vehicle as claimed in claim 8 in which the sensing means comprises a hinged vane in the supply port, which vane senses the direction of flow of the curtain forming fluid from the supply port.

10. A vehicle for travelling over a surface which is at least partly supported above that surface by a cushion of pressurised gas at least partly formed and contained beneath the vehicle by a curtain of fluid issuing from an annular supply port formed in the bottom of the vehicle adjacent to the periphery thereof, said vehicle comprising an annular recovery port formed in the bottom of the vehicle, inboard of and substantially parallel to the supply port, through which part of the curtain forming fluid is normally recovered for re-use, the recovery port being adjacent to the supply port and bounding an area of the bottom surface of the vehicle inboard of said recovery port against which the cushion pressure is exerted during normal operation of the vehicle, and means for controlling the flow of curtain forming fluid into the recovery port at a plurality of points around the periphery of the vehicle.

11. A vehicle as claimed in claim 10 in which the means for controlling the flow of fluid into the recovery port are responsive to variations in the configuration of the fluid curtain at said plurality of points around the periphery of the vehicle.

References Cited by the Examiner
UNITED STATES PATENTS 2,838,257    6/58    Wibault.

FOREIGN PATENTS 1,238,499    7/60    France.
1,240,721    8/60    France.

A. HARRY LEVY, *Primary Examiner.*

PHILIP ARNOLD, *Examiner.*